Oct. 24, 1972   N. FUHRMAN   3,700,568
ELECTROCHEMICAL CARBON METER
Filed April 14, 1969
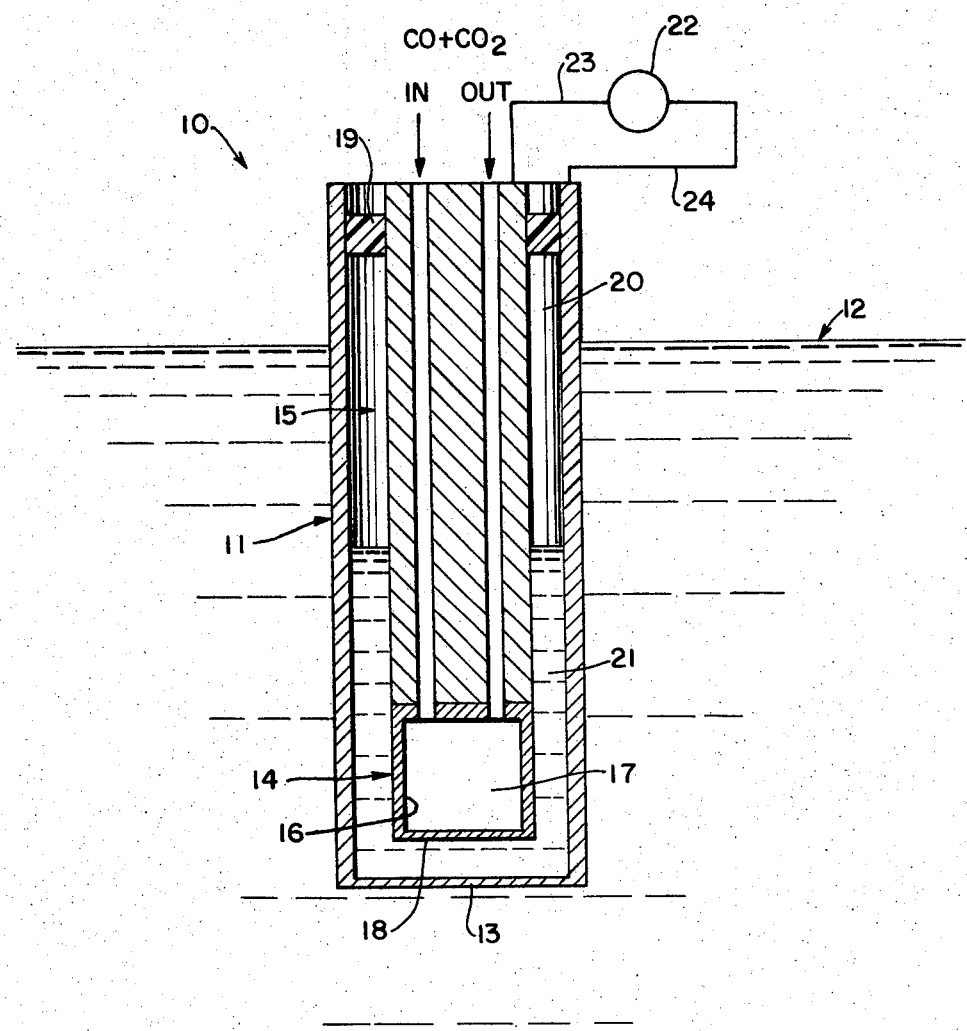
INVENTOR
NATHAN FUHRMAN
BY Pennie, Edmonds
Morton, Taylor & Adams
ATTORNEYS United States Patent Office 3,700,568
Patented Oct. 24, 1972

3,700,568
ELECTROCHEMICAL CARBON METER
Nathan Fuhrman, Shrub Oak, N.Y., granted to the United States Atomic Energy Commission under the provisions of 42 U.S.C. 2182
Filed Apr. 14, 1969, Ser. No. 815,947
Int. Cl. G01n 27/26, 27/30, 27/40
U.S. Cl. 204—1 T
13 Claims

ABSTRACT OF THE DISCLOSURE

The carbon content in a high temperature fluid such as molten metal or a carburizing gas is measured by immersing thereinto a probe to form an equilibrium electrolytic cell. The probe is in the form of a metallic closed-end tube impervious to the fluid but permeable to carbon. Inside the tube is a carbon reference electrode electrically insulated therefrom except through its annulus which is filled with a fused salt electrolyte containing carbon ion charge carriers in solution.

BACKGROUND OF THE INVENTION

(I) Field of the invention

This invention relates to the determination of carbon content in a high temperature fluid using an equilibrium electrolytic cell, the EMF of which corresponds to the carbon content in the fluid.

(II) Description of the prior art

The carbon content or carbon activity in a high temperature fluid such as a molten metal or carburizing gas can be determined by standard analytical techniques such as by chemical analysis of samples of the fluid withdrawn periodically from the main body of fluid. However, chemical analysis is time consuming and cumbersome and in many instances does not lend itself to continuous monitoring of process streams. The fact that carbon is absorbed by iron, steel or nickel instruments which are exposed to the carbon-containing fluid has also been utilized to determine carbon content of high temperature fluids and gases. The changes in the properties of an iron, steel or nickel probe in contact with the fluid or gas, or changes in the properties of the second fluid or gas also in contact with the probe provide a measure of the carbon content of the first fluid or gas being monitored. However, the continuous monitoring of high temperature fluids such as liquid metals, heretofore, used methods that required expensive and elaborate test equipment and relied on principles which had many inherent disadvantages, particularly for determining carbon contents in liquid alkaki metals.

The need for a simple, economical and yet reliable method for measuring carbon content in high temperature fluids, particularly liquid metal, is increasing for a number of reasons. For example, liquid metals such as liquid sodium and liquid NaK are the preferred coolants for fast breeder reactors and for some other nuclear reactors and the tolerance for carbon in the liquid metal used as coolants for the aforesaid systems is very low.

In certain nuclear reactors, the need for continuously monitoring carbon content arises because embrittlement of steel piping and other metal equipment with which the molten metal comes into contact will result unless the carbon content of the molten metal is kept to the minimum possible. The embrittlement of the structural metal or the nuclear fuel cladding can therefore be caused by very small concentrations of carbon. In addition, the carbon content of sodium may have a major effect upon the activity of other impurities, such as hydrogen with which it may combine to form methane.

Heretofore, the continuous monitoring of carbon content of various environments employed a metal sensor for the in-line detection or measurement of carbon. The monitoring depended upon the diffusion of carbon out of the carbon-containing fluid or gas and through a ferrous or nickel diaphragm to a means of detection. The sensor consists of a thin walled thimble positioned in the line being measured. The interior of the thimble is connected to a stream of decarburizing gas which sweeps the interior of the tube and carries away the carbon which has permeated therethrough to be subsequently analyzed for carbon content.

This previous continuous monitoring device is, in essence, a carbon extractor and it suffers from the disadvantage that it does not measure directly the activity of the carbon in the sodium or other fluid or gaseous environment. The measurement also depends upon the rate at which carbon diffuses through the barrier. As such it is susceptible to error and instability if service conditions alter the permeability of the diaphragm, for example, by film formation or by changes in the microstructure or composition.

Another aspect of carbon monitoring by extraction is that, in principle, it must always change the carbon concentration in the region being measured. In a large system where the sodium is moving rapidly past the sensor, this effect will be insignificant. However, in a smaller ssytem, or in relatively stagnant sodium, this can be a serious perturbation.

SUMMARY OF THE INVENTION

I have now discovered that the carbon content in a high temperature fluid can be determined simply and efficiently without disturbing the carbon concentration in the system being monitored by the method and apparatus of this invention which is based on an equilibrium galvanic measurement. Broadly stated, the method of this invention requires the establishment of a first electrode by contacting a first electrically conductive element with the fluid whose carbon content is to be measured. The conductive element used is impervious at the contacting area to the fluid and at least a portion of said area is permeable to carbon. A reference electrode is formed by contacting a second electrolytically conductive element with a soure of carbon confined within a zone with walls at least a portion of which are permeable to carbon. The carbon source has a predetermined pressure or activity. The first and the reference electrodes are joined at areas permeable to carbon with an electrolyte which contains carbon ions and conducts substantially solely by ion transport thereby forming an electrolytic cell. The EMF of the cell which correlates with the carbon content of the fluid is measured in a conventional manner.

Advantageously, the method of this invention is carried out using an apparatus which has a metallic probe adapted for contacting the fluid at one side of its surface. The wall of the probe is impervious at the contacting area to the fluid and at least a portion of the area is a septum permeable to carbon. Spaced apart and electrically insulated from the wall of the probe is a reference electrode in the form of a conductive element which is in contact with a carbon source of predetermined activity confined in a chamber at least a portion of whose wall is permeable to carbon. An electrolyte which contains carbon ions and conducts substantially solely by ion transport is used to join the reference electrode and the probe by contacting the areas where the carbon is permeable thereby forming a cell when the probe is in contact with the fluid. Conventional voltage measuring means are connected to the probe and the electrode to determine the EMF of the cell which corresponds to the carbon content in the fluid in equilibrium with the probe.

Preferably, the carbon source of the reference electrode is a flowing gas mixture of carbon monoxide and carbon dioxide.

BRIEF DESCRIPTION OF THE DRAWING

The accompanying single sheet of drawing illustrates schematically an apparatus for measuring carbon content of a high temperature fluid in accordance with the present invention.

DESCRIPTION OF THE PREFERRED EMBODIMENT

As shown in the drawing, the apparatus 10 comprises a metallic probe 11 adapted for immersing into the liquid metal 12, which, preferably, is in the form of a tube closed with a metallic septum 13 which is impervious to the liquid metal but permeable to carbon. Inside the hollow probe 11 is a reference electrode 14 which comprises an electrically conductive cylindrical element 15 the lower end of which is integrally bonded to a cylindrical chamber 16 containing a source of carbon 17. The chamber 16 is also equipped with a metallic septum 18 at its bottom which is permeable to carbon but impervious to alkali metals, hydrides, and salts.

The reference electrode is concentrically positioned within and mounted on the hollow probe 11 at the upper end with an insulating material 19, thus electrically insulating the probe from the reference electrode. The annular space 20 between the probe and the reference electrode is partially filled with an electrolyte 21 to a height extended above chamber 16. The EMF of the electrolytic cell is measured with a conventional potentiometer 22 which is connected to the probe and the reference electrode by wires 23 and 24 respectively.

Advantageously the cylindrical casing of the probe 11 is constructed from a metal which is substantially inert and impervious to the high temperature fluid. The metallic septum 13 may be made from the same material as the one used for the cylindrical casing but from thinner stock so the carbon permeation is improved. For liquid alkali metal, I found iron, nickel, vanadium, cobalt and their alloys to be particularly suitable for the construction of the casing and the septum.

The electrically conductive element 15 as well as the chamber 16 can be any metal which is substantially inert at the environment being used. Metals similar to the ones mentioned above can also be used for probe 11. The metallic septum 18, of course, should be made of thin stock which possesses the aforesaid high carbon permeability.

The carbon source 17 for the reference electrode 14, preferably, is a flowing gas mixture of carbon monoxide and carbon dioxide. This gas mixture is ideal for use as a reference electrode because the carbon source has a constant carbon activity at constant temperature thereby permitting calibration to give a relationship between EMF and the carbon activity of the unknown.

The electrolyte suitable for the present invention is a fusible salt or a mixture of salts, having therein one or more ionic carbides or acetylides. Several fusible salts that dissolve the ionic carbides are suitable for use in combination with said carbides. Preferably, the fusible salts or the mixtures of salts are alkali metal hydrides or alkaline metal halides. Advantageously, the halides are chlorides or bromides. The selection of the particular fusible salt or a mixture of salts in combination with the ionic carbides is dependent, to a large extent, on the fusion temperature of the salts, which must be lower than the temperature of the fluid being measured. The preferred liquid types of electrolyte are LiH containing $Li_2C_2$ or $CaC_2$ in solution and $CaCl_2$ containing $CaC_2$ in solution because it has been shown that molten lithium hydride (LiH) is an ionizing solvent for lithium carbide as well as calcium carbide ($CaC_2$) and that calcium chloride is an ionizing solvent for calcium carbide ($CaC_2$). However, the use of $CaCl_2$ as the main constituent of the electrolyte imposes a lower temperature limit for operation as a liquid electrolyte corresponding to the melting point of $CaCl_2$ (771° C.) i.e., one may wish to monitor the carbon content of a fluid which has a temperature below 771° C. This temperature limit may be lowered by adding a lithium compound such as LiCl or LiBr or other fused salt diluents. The only limitation to such additions is that such additions should not suppress the ionization of the carbide constituent of the electrolyte or reduce the mobility of the acetylide ion.

When an electric current is passed through a melt containing the ionized carbides or acetylide ions ($C_2^{-2}$), carbon is deposited at the anode. The fact that electrolysis of the dissolved carbide in a suitable alkali or alkaline metal salt or a mixture of salts will lead to the discharge of carbon at the anode only, is strongly indicative that the carbon is present and mobile in such molten system as the negative acetylide ion ($C_2^{-2}$).

The mechanism of the method and apparatus of this invention may be explained by reference to the drawing by the following specific example. In this example, the septa 13 and 18 are ion disks, the electrolyte 21 is $CaCl_2$ having dissolved therein about 5% by weight of $CaC_2$ and the source of the carbon 17 is a mixture of CO and $CO_2$ gases. The apparatus 10 as shown is immersed in liquid sodium whose carbon concentration is being detected.

The outer septum 13, after being immersed in the sodium for a short period comes to equilibrium with the liquid sodium so that the carbon activity is the same in both. For the purpose of illustration, let this activity be $[C]_x$. The inner septum 18 similarly acquires a lower carbon activity, $[C]_{ref.}$, characteristic of the gases (i.e., $CO+CO_2$) contacting it. The result is an electrolytic cell which may be written in the following form:

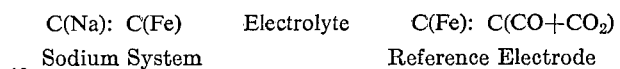

Sodium System            Reference Electrode

At the sensing electrode (the probe 11)

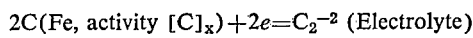

At the reference electrode 15

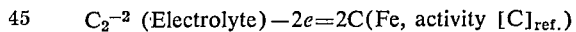

The overall virtual cell reaction is simply the nominal transfer of carbon from the sodium to the gaseous mixture of carbon monoxide and carbon dioxide. The actual transfer of carbon is substantially zero, because the measurement is potentiometric with extremely low current flows. The cell voltage, E, is expressed by the following relationship:

$$E = \frac{RT}{2F} \ln \frac{[C]_{ref}}{[C]_x}$$

where brackets denote chemical activity, R is the gas constant, T is the absolute temperature, and F is the Faraday constant. Since $[C]_{ref}$ is known from existing thermodynamic data, the carbon activity in the sodium is obtained directly from the voltage measurement.

The preferred embodiment of this invention is very small, less than 1 inch in diameter and less than 6 inches long and the response time is fast, generally better than about 5 seconds and is capable of detecting a lower concentration of carbon in liquid metal less than about 1 p.p.m.

I claim:
1. A method of measuring the carbon content of a fluid at an elevated temperature of above about 200° C. which comprises:
   establishing a first electrode by contacting a first electrically conductive element with said fluid whose carbon content is to be measured, said first element being impervious at the contacting area to the fluid and at least a portion of said area being permeable to carbon;

forming a reference electrode by contacting a second electrically conductive element with a source of carbon, said source of carbon having a predetermined activity;

joining the areas of said first and reference electrodes permeable to carbon with an electrolyte which contains acetylide ions and conducts substantially solely by ion transport thereby forming an electrolytic cell; and determining the EMF of the cell which correlates with carbon content of said fluid.

2. A method according to claim 1 wherein the electrolyte is selected from a group consisting of alkali metal hydrides, alkali metal halides, alkaline earth metal halides, and a mixture of said hydrides and halides, said electrolyte having therein at least a trace amount of carbon at a concentration sufficient to provide an adequate carbon ion conductance and the required carbon ion conductive mechanism.

3. A method according to claim 2 wherein the carbon in the electrolyte is provided by the addition therein of an alkali metal carbide or an alkaline earth metal carbide or a mixture thereof.

4. A method according to claim 1 wherein said fluid is a liquid metal.

5. A method according to claim 1 wherein said carbon source of the reference electrode is a gaseous mixture of carbon dioxide and carbon monoxide.

6. A method of measuring the carbon content of a liquid metal which comprises:

establishing a first electrode by contacting the liquid metal with a metallic element selected from the group consisting of iron and nickel or one of their alloys, said element being in a form impervious to the liquid metal at the contacting area and at least a portion of said contacting area being permeable to carbon and in equilibrium with the carbon content of the liquid metal;

forming a reference electrode by contacting an electrically conductive element with a gaseous mixture of carbon monoxide and carbon dioxide having a predetermined carbon activity, the carbon-containing gaseous mixture being confined within a chamber having walls at least a portion of which is permeable to carbon;

joining the areas of said first and reference electrodes permeable to carbon with a fused salt electrolyte selected from a group consisting of alkali metal halides, alkaline earth metal halides, alkali metal hydrides, and a mixture of said halides and hydrides, said electrolyte having therein at least a trace amount of carbon ions at a concentration sufficient to provide an adequate carbon ion conductance and a required carbon ion conductive mechanism, thereby forming an electrolytic cell; and determining the EMF of the cell which correlates with the carbon content of said fluid.

7. A method according to claim 6 wherein the liquid metal is sodium.

8. An apparatus for measuring the carbon content of a fluid which comprises:

a metallic probe suitable for contacting said fluid at one side of its surface, said probe being impervious at the contacting area to the fluid and at least a portion of said area being a septum permeable to carbon in said fluid;

a reference electrode spaced apart from said probe, said electrode comprising an electrically conductive element and a chamber adapted to contain a carbon source with a predetermined activity and in direct contact with said electrically conductive element, said chamber having at least a portion of its wall permeable to carbon;

an electrolyte positioned within the space between the probe and said reference electrode and in direct contact with the septum of said probe at the opposite side of the contacting surface and with the outer wall of said chamber of the reference electrode permeable to carbon, said electrolyte containing carbon ions and conducting substantially solely by ion transport; and means for measuring the EMF between the probe and the reference electrode when said probe is in contact with the fluid.

9. An apparatus according to claim 8 wherein the electrolyte is selected from the group consisting of alkali metal hydrides, alkali metal halides, alkaline earth metal halides and a mixture of said hydrides and halides, said electrolyte having therein at least a trace amount of carbon.

10. An apparatus according to claim 8 wherein the carbon in the electrolyte is provided by the addition therein of an alkali metal carbide or an alkaline earth metal carbide.

11. An apparatus for measuring the carbon content of a liquid metal which comprises:

a hollow metallic probe adapted for immersing into the liquid metal, the immersed portion of said probe being impervious to the liquid metal and having at said portion a septum permeable to the carbon;

a reference electrode positioned within said probe and electrically insulated therefrom, said reference electrode comprising an electrically conductive element and a chamber of carbon adapted to contain a gaseous mixture of carbon monoxide and carbon dioxide having a predetermined carbon activity and in direct contact with said electrically conductive element, the wall of said chamber having an inner septum permeable to carbon;

an electrolyte filling at least a portion of the space within said probe in an amount sufficient to join the septa, said electrolyte comprising a halide, or a hydride, or a mixture of halides and hydrides selected from a group consisting of alkali metal halides and hydrides and alkaline earth metal halides and at least a trace amount of carbon ion; and means for measuring the EMF between the probe and the reference electrode after the probe is immersed in the liquid metal and the carbon content of the septum is in equilibrium with the carbon content of the liquid metal, said EMF corresponding to the carbon content in said liquid metal.

12. An apparatus according to claim 11 wherein the halide is bromide or chloride.

13. An apparatus according to claim 12 wherein the metal for the probe is iron, nickel, vanadium, cobalt or one of their alloys.

References Cited
UNITED STATES PATENTS 3,523,066   8/1970   Morris et al. _____ 204—1

GERALD L. KAPLAN, Primary Examiner

U.S. Cl. X.R.

204—195; 324—29, 71 R